United States Patent Office 3,313,386
Patented Apr. 11, 1967

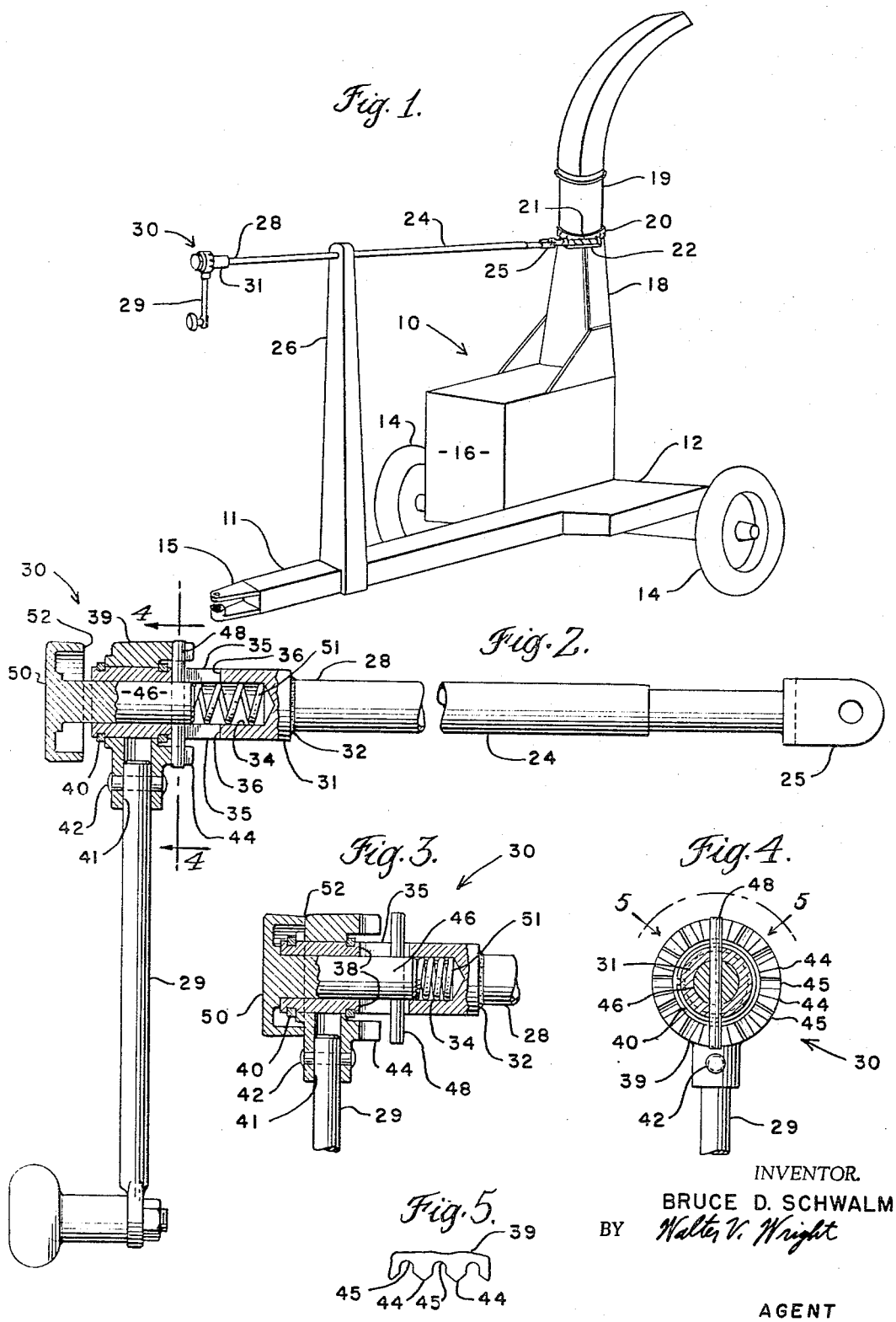

3,313,386
HARVESTER SPOUT CONTROL
Bruce D. Schwalm, Leola, Pa., assignor to Sperry Rand Corporation, New Holland, Pa., a corporation of Delaware
Filed Feb. 3, 1966, Ser. No. 524,745
2 Claims. (Cl. 193—22)

This invention relates generally to harvesters. More specifically, it relates to means for controlling the direction of the stream of crop material that is discharged from a harvester discharge spout during operation.

Harvesters are well known argicultural implements which cut and chop forage or other crops and expel a stream of chopped crop material through a spout into a nearby, parallel travelling wagon, truck, or other receiving unit. The discharge spouts are located at the rear of the harvesters and are pivotally mounted to enable the operator to swing the spout to control the direction of the stream of material discharging from the harvester.

The operator is usually located ahead of the harvester at the driver's station of a tractor or other towing vehicle. A rotatable control rod extends forwardly from the discharge spout to the operator's station on the towing vehicle. A ring and worm gear arrangement, or the equivalent, is provided between the rear end of the control rod and the discharge spout to enable the operator to swing the spout laterally by rotating the forwardly extending control rod about its own axis. This arrangement affords the operator the precise adjustment control of the discharge spout necessary to direct the stream of crop material into the corners and sides of a wagon without missing the wagon. A crank handle on the front end of the control rod enables the operator to rotate the control rod about its own axis with minimum effort.

The operation of the towing vehicle requires the full attention of the operator. It is therefore important that the discharge spout remain in the precise position to which the operator has set it until such time as he desires to change the setting. In current harvesters, the spout has been found to have a tendency to drift laterally from the chosen position. The operator is required to continually direct his attention rearwardly to the spout to insure that the stream of discharging material has not wandered from the chosen setting. Frequent small adjustments of the control rod are often required.

It has been found that the tendency of the discharge spout to drift from a chosen setting is due to the effects of gravity and operating vibrations on the control crank handle. If a desired spout setting leaves the control handle disposed in any position other than vertically downwardly from the axis of the control shaft, the crank handle will gradually settle, in operation, to the lowest position. This action effects a rotation of the control shaft and changes the discharge spout setting. While counterbalancing of the crank handle would theoretically correct the tendency of the crank handle to drift, or settle, in actual practice this results in erratic wandering of the crank position due to operating vibrations and the like and the forces of the spout on the worm assembly which, with a counterbalanced crank handle, offers much less resistance to rotation. It is not desirable to provide a positive locking latch mechanism which would increase the difficulty of operation of the spout control mechanism.

It is an object of this invention to provide control means for the discharge spout of a harvester or the like which provides accurate and dependable manual control of the path of discharge of material from the harvester.

It is another object of this invention to provide position control and adjusting means for the discharge spout of a harvester or the like which prevents drifting of the spout from a chosen setting during harvester operation.

It is another object of this invention to provide control and adjusting means according to the foregoing objects, whose operation requires very little effort and attention on the part of an operator.

It is another object of this invention to provide control means according to the above object which is rugged, mechanically simple, and capable of readily being added to existing harvester spout control devices with a minimum of modification to existing structures.

These and other objects and advantages of this invention will be clear upon reference to the following description and claims taken in conjunction with the accompanying drawings wherein:

FIG. 1 is a semi-diagrammatic front perspective view of a forage harvester illustrating the discharge control means of the present invention;

FIG. 2 is a fragmentary side elevational view of the front portion of the control means of the present invention;

FIG. 3 is a fragmentary side elevational view of the front portion of the control means of the present invention similar to FIG. 2 but showing elements of the control mechanism in another position;

FIG. 4 is a sectional view taken on the line 4—4 of FIG. 2; and

FIG. 5 is a profile view of the clutch teeth of the present invention taken on the line 5—5 of FIG. 4.

Referring now to the drawings in detail, particularly FIG. 1, the reference numeral 10 indicates, generally, a conventional forage harvester having a front end 11 and a rear end 12. Ground engaging support wheels 14 are journalled on the forage harvester frame adjacent the rear end thereof to support the machine for movement over the ground. A towing hitch 15 is provided at the front end 11 of the harvester frame and is adapted to be coupled with a conventional farm tractor or the like. The reference numeral 16 indicates the main body or housing of the forage harvester. As is well known in the art, various types of header units, depending on the type of crop to be harvested, are removably attachable to the front of main body portion 16. Such header units cut or gather crop material and deliver it rearwardly into housing 16 wherein the material is chopped into fine particles and thrown from the machine into a trailing wagon or the like.

The chopped crop material is discharged through a spout having a lower section 18 fixedly mounted on the main harvester body at the rear end thereof. The upper portion 19 of the discharge spout is carried by the fixed portion 18 for swiveling movement relative thereto about the central axis of the spout between a plurality of positions affording lateral or rearward discharge. A ring gear of the rack type is indicated by the reference numeral 20. This gear is fixedly carried by the upper spout portion 19. A worm pinion 21 is journalled in a bracket 22 fixedly carried by lower spout portion 18. The worm pinion 21 meshes with the teeth of ring rack 20. A forwardly extending control rod 24 is connected to worm pinion 21 by a universal joint 25. Control rod 24 extends forwardly through a vertical support stanchion 26, in which the rod is journalled, and has a forward terminal end 28 located within reach of the operator of a tractor coupled to draft hitch 15. A crank handle 29 is carried by control rod 24 at the forward terminal end 28 thereof. Engageable and disengageable clutch means 30 is provived between crank handle 29 and control rod 24.

In FIGS. 2–5, the details of clutch device 30 may be observed. A hollow cylindrical extension piece 31 is welded at 32 to the forward terminal end 28 of control rod 24. This piece, after being attached to the control rod, actually constitutes an integral part, or extension, of the control rod 24. The cylindrical piece 31 has an internal axial bore 34 and a transaxial slot 35 which is elongated in the direction of extent of the axis of piece 31 and control rod 24. The slot 35 has a rear end 36 which is clearly identifiable in FIG. 2, and a forward end 38 which is clearly identified in FIG. 3. An annular member 39 is journalled on the extension piece 31 of rod 24 for free rotation relative thereto about the axis of the control rod. A set of two snap rings 40 (see FIGS. 2 and 4) are received in annular grooves in member 31 and serve to fix annular member 39 in the axial direction on piece 31. The crank handle 29 is received and fixed in a radial bore 41 in member 39 by rivets 42 or the like.

An annular series of clutch teeth 44 is formed on the rear face of clutch member 39. The teeth 34 have spaces 45 therebetween as may be best seen in FIG. 5. A manual movable control member, having a cylindrical body 46, is received in the axial bore 34 of piece 31. The cylindrical body 46 of the control member carries a transversely extending clutch pin 48 (FIG. 3) which extends through the transaxial slot 35 in piece 31. It will be apparent in FIGS. 2 and 3 that when the cylinder 46 is moved to the left, or forwardly, to bring clutch pin 48 into engagement with the forward end 38 of transaxial slot 35, the transversely projecting end portions of pin 48 are registerable with the spaces 45 between the clutch teeth 44 on annular member 39. When the cylindrical body 46 of the control member is moved to the right, or rearwardly, to carry clutch pin 48 to the rear end 36 of transaxial slot 35, the clutch pin 48 is carried rearwardly beyond the reach of the annular series of clutch teeth 44. The control cylinder or member 46 is provided at its forwardmost end with a push button type actuator portion 50. A coil compression spring 51 is received in the axial bore 34 of member 31 behind cylinder 36 and serves to bias the control cylinder 46 and its actuator portion 50 to the left, or forwardly, as will be apparent in FIGS. 2 and 3. This arrangement biases the clutch device to the engaged position. In the normal engaged position shown in FIG. 2, the annular member 39 and the crank handle 29 fixed thereto, are drivingly connected to control rod 24 through the clutch teeth 44, the clutch pin 48, and the sides of transaxial slot 35 in member 31. When the control portion 50 of cylinder 46 is depressed rearwardly to the position shown in FIG. 3, the annular member 39 and the crank handle 29 fixed thereto are free to rotate about the extension piece 31 of the control rod 34, since the clutch pin 48 is moved rearwardly out of engagement with clutch teeth 44 on the annular member 39. The control button portion 50 of the clutch device is provided with an annular rear edge 52 (FIG. 2) which is adapted to bear against the forward face of annular member 39 after clutch pin 48 has been carried rearwardly out of engagement with clutch teeth 44.

The crank handle 29 is usually rather large and has considerable mass. In operation, to adjust the angular position of the discharge spout, the operator grasps handle 29 and rotates it about the axis of control rod 24. The normally engaged clutch means 30 effects rotation of the control rod 24 along with crank handle 29. When the desired spout setting is reached, the crank handle 29 will rarely, and only by chance, be disposed in the vertical depending position shown in the drawing. If it is not in the position shown, the operator depresses the clutch control member 50 to disengage the driving connection between crank handle 29 and rod 24. As soon as clutch pin 48 clears teeth 44, the crank handle 29 swings downwardly under the influence of gravity to the vertical rest position shown in the drawings. Contact the edge portion 52 of the control button 50 with the annular member 39 provides sufficient frictional drag to prevent crank handle 29 from swinging back and forth in a pendulum action. The crank handle merely settles to the vertical depending rest position shown. Upon release of control member 50 by the operator, the spring biased clutch reestablishes the driving connection between annular member 39 and control rod 24. This arrangement not only avoids rotational drift of control rod 24 under the influence of gravity acting on crank handle 29, but also lets the crank handle 29 in a rest position wherein its mass and gravity opposed rotational drifting movement of the control rod 24. This device successfully resists drifting of the control spout from the chosen setting. It is easy for the operator of a towing vehicle to lean rearwardly on clutch control button 50 to operate the clutch mechanism. The effort and concentration required on the part of the operator to use the control device disclosed herein does not noticeably exceed the effort required to effect a spout position change with a conventional fixed crank construction.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a harvester having a mobile frame and a crop material discharge spout mounted on said frame for pivotal movement relative thereto, improved means for controlling the position of said spout to control the direction of crop material discharge comprising, a shaft supported on said frame for rotation about its own axis, means connecting one end of said shaft to said spout to pivot said spout in response to rotation of said shaft, a crank handle carried by said shaft, engageable and disengageable clutch means drivingly fixing said crank handle to said shaft when said clutch means is engaged, said clutch means comprising an annular member journalled on said shaft means fixing said crank handle on said annular member, a series of teeth on said annular member extending around said shaft and having spaces therebetween opening in the direction of extent out of the axis of said shaft, a slot extending transversely through said shaft and being elongated in the direction of extent of said shaft axis, said slot having one end thereof underlying the spaces between said teeth and the other end disposed axially beyond the reach of said teeth, a pin extending through said slot and having ends receivable in said spaces when said pin is disposed at said one end of said slot, said pin being axially clear of said teeth when disposed at said other end of said slot, a spring operative engaging said pin and biasing it axially to said one end of said slot, and a member fixed to said pin and carried by said shaft for manual axial movement relative to the shaft to move said pin, in opposition to said spring, out of engagement with said teeth, thereby freeing said annular member and said crank handle for rotation about the axis of said shaft to gravitate said handle about said shaft to a generally vertical depending rest position when said spout has been located in a desired position, whereby gravity acting on said handle opposes rotational drifting of said shaft from the desired setting upon reengagement of said pin and said teeth by said spring.

2. In a harvester, the improved spout position control means recited in claim 1 wherein said manually movable member has a portion engageable with said annular member when said pin is disengaged from said teeth to frictionally retard free swinging pendulum movement of said crank handle about said shaft.

References Cited by the Examiner
UNITED STATES PATENTS

| | | | |
|---|---|---|---|
| 3,091,978 | 6/1963 | Rubinstein | 74—545 |
| 3,208,302 | 9/1965 | Lewis | 74—548 |
| 3,251,631 | 5/1966 | Hennen | 193—22 |

EVON C. BLUNK, *Primary Examiner.*

H. C. HORNSBY, *Assistant Examiner.*